United States Patent
Inaba et al.

(10) Patent No.: US 11,092,105 B2
(45) Date of Patent: Aug. 17, 2021

(54) INJECTION CONTROL DEVICE

(71) Applicant: DENSO CORPORATION, Kariya (JP)

(72) Inventors: Masashi Inaba, Kariya (JP); Yuusuke Shimizu, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/014,302

(22) Filed: Sep. 8, 2020

(65) Prior Publication Data

US 2021/0071609 A1 Mar. 11, 2021

(30) Foreign Application Priority Data

Sep. 10, 2019 (JP) .............................. JP2019-164523

(51) Int. Cl.
*F02D 41/20* (2006.01)
*F02D 41/30* (2006.01)
*F02D 41/00* (2006.01)
*F02M 51/00* (2006.01)

(52) U.S. Cl.
CPC ........... *F02D 41/20* (2013.01); *F02D 41/009* (2013.01); *F02D 41/3005* (2013.01); *F02M 51/00* (2013.01); *F02D 2041/2003* (2013.01); *F02D 2041/2024* (2013.01); *F02D 2041/2055* (2013.01)

(58) Field of Classification Search
CPC .... F02D 41/20; F02D 41/009; F02D 41/3005; F02D 2041/2055; F02D 2041/2003; F02D 2041/2024; F02M 51/00

USPC ....................... 123/478, 482, 490; 73/114.49
See application file for complete search history.

(56) References Cited

FOREIGN PATENT DOCUMENTS

| JP | 2014-231863 A | 12/2014 |
| JP | 2019-085925 A | 6/2019 |
| WO | 2013/191267 A1 | 12/2013 |

OTHER PUBLICATIONS

U.S. Appl. No. 17/014,303, filed Sep. 8, 2020, Inaba.

*Primary Examiner* — Hai H Huynh
(74) *Attorney, Agent, or Firm* — Posz Law Group, PLC

(57) ABSTRACT

An energization instruction switch switches energization instruction signals to instruct energization of fuel injection valves. A first cylinder designation switch designates one of the energization instruction signals to designate a valve closing detection cylinder. A valve closing detection unit monitors downstream voltage of the fuel injection valve to detect occurrence of an inflection point in change of the downstream voltage to detect a valve closing. A second cylinder designation switch designates one of the downstream voltages and designates the valve closing detection cylinder. A valve closing time measuring unit measures a valve closing time, which is from a switching timing of the energization instruction signal from ON to OFF to a valve closing detection timing, for injection of the valve closing detection cylinder. A valve closing time learning unit learns the valve closing time measured by the valve closing time measuring unit.

9 Claims, 10 Drawing Sheets

INJECTION CONTROL DEVICE

CROSS REFERENCE TO RELATED APPLICATION

The present application claims the benefit of priority from Japanese Patent Application No. 2019-164523 filed on Sep. 10, 2019. The entire disclosures of all of the above applications are incorporated herein by reference.

TECHNICAL FIELD

The present disclosure relates to an injection control device.

BACKGROUND

An injection control device that controls opening and closing of a fuel injection valve to inject fuel into an internal combustion engine is known.

SUMMARY

According to an aspect of the present disclosure, an injection control device is configured to control opening and closing of a plurality of fuel injection valves to inject fuel to an internal combustion engine.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
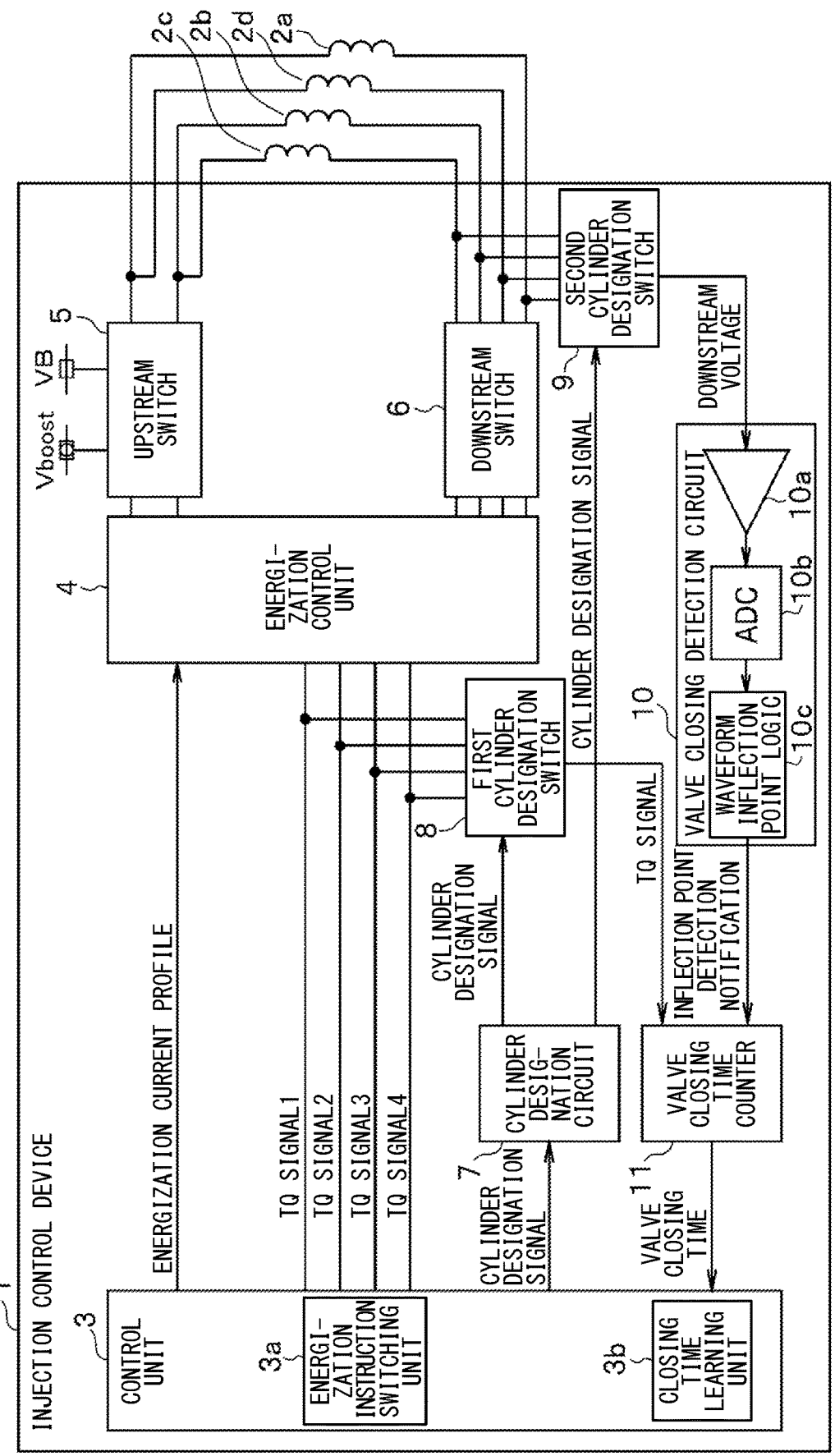
FIG. 1 is a functional block diagram showing a configuration according to a first embodiment.

Hereinafter, embodiments of the present disclosure will be described.

An injection control device according to one embodiment of the present disclosure controls opening and closing of a fuel injection valve to inject fuel to an internal combustion engine. The injection control device supplies a current to the fuel injection valve in accordance with a conduction current profile that is based on a predetermined command injection amount and controls opening and closing of the fuel injection valve.

In a direct injection control according to an embodiment of the present disclosure, multi-stage injection control is performed in which fuel required for one combustion is divided into multiple times to form an ideal spray in a cylinder of the engine. At that time, the multi-stage injection control is performed by combining multiple injections which are different in injection time. Among them, accuracy of an injection amount of a minute injection, which is shorter in injection time than that of the normal injection, has a large influence on achievement of exhaust gas regulations. A valve closing detection is a technique is to learn a valve closing time to enhance the accuracy of the injection amount of this minute injection. When the multi-stage injection control is performed, overlap occurs in injections of the cylinders. In particular, minute injection is generally performed at the end of an intake stroke or in a compression stole of the engine. Therefore, an issue could arises that the learning of the valve closing time cannot be properly performed due to an overlap which could frequently occur with injection in another cylinder.

According to an embodiment of the present disclosure, with respect to such an issue that the learning of the valve closing time cannot be properly performed, the following may be conceived. For example, in a 4-cylinder configuration of an engine, injections of cylinders that are not in the antiphase relationship (combustion stroke and intake stroke, exhaust stroke and compression stroke) may overlap. To the contrary, injections of the cylinders in the opposite phase relationship do not overlap. Therefore, it is conceivable to provide two valve closing detection circuits to detect valve closing at maximum. However, in the configuration described above, a concern arises that a manufacturing cost may increase due to the increase in the valve closing detection circuit.

According to an example of the present disclosure, an injection control device is configured to control opening and closing of a plurality of fuel injection valves to inject fuel to an internal combustion engine. The injection control device comprises an energization instruction switch configured to switch a plurality of energization instruction signals ON and OFF to instruct energization of the plurality of fuel injection valves. The injection control device further comprises a first cylinder designation switch configured to designate one of the plurality of energization instruction signals, which correspond to the plurality of fuel injection valves respectively, to designate a valve closing detection cylinder. The injection control device further comprises a valve closing detection unit configured to monitor a plurality of downstream voltages of the fuel injection valve to detect occurrence of an inflection point in change of the plurality of downstream voltages and to detect valve closing. The injection control device further comprises a second cylinder designation switch configured to designate one of the plurality of downstream voltages, which correspond to the plurality of fuel injection valves respectively, and to designate the valve closing detection cylinder. The injection control device further comprises a valve closing time measuring unit configured to measure a valve closing time, which is from a switching timing at which the energization instruction signal is switched from ON to OFF to a valve closing detection timing at which the valve closing detection unit detects the valve closing, for injection of the valve closing detection cylinder. The injection control device further comprises a valve closing time learning unit configured to learn the valve closing time measured by the valve closing time measuring unit.

The configuration designates the valve closing detection cylinder among the plurality of cylinders. The configuration measures the valve closing time, which is from the timing of switching of the energization instruction signal from ON to OFF to the valve closing detection timing, for the designated valve closing detection cylinder and learns the valve closing time. The configuration designates the valve closing detection cylinder from the plurality of cylinders, thereby to enable to avoid increase in the number of the valve closing detection circuit in advance. The configuration enables to appropriately learn the closing time and to appropriately increase the injection amount accuracy, while eliminating the concern of cost increase due to the increase in the number of the valve closing detection circuit.

Hereinafter, embodiments of the present disclosure will be described with reference to drawings. In the embodiments, elements corresponding to those which have been described in the preceding embodiments are denoted by the same reference numerals, and redundant description may be omitted.

First Embodiment

A first embodiment will be described with reference to FIG. 1 to FIG. 5. As shown in FIG. 1, an injection control device 1 controls driving of solenoid injectors 2a to 2d (corresponding to fuel injection valves) that inject fuel into an internal combustion engine mounted in a vehicle such as an automobile. The injection control device 1 includes an electronic control unit (ECU). The injector 2a and the injector 2d are arranged in the cylinders respectively in the opposite phases. Injection of the injector 2a and injection of the injector 2d are in a non-overlapping relationship. The injector 2b and the injector 2c are arranged in the cylinders having a relationship of opposite phases. The injection of the injector 2b and the injection of the injector 2c are in a relationship of non-overlapping. In other words, injection of the injector 2a and injection of the injector 2d have a relationship of overlapping. In addition, injection of the injector 2b and injection of the injector 2c have a relationship of overlapping. The present embodiment discusses an example of a configuration of four cylinders including four injectors 2a to 2d. It is noted that, the number of the cylinders may be optional and may be six and eight or other numbers, as long as the configuration includes injectors, in which the injections do not overlap with each other, and injectors, in which injections overlap with each other.

Each of the injectors 2a to 2d may perform a multi-stage injection control on control of the injection control device 1 to perform a combination of normal injection having a relatively long injection time and minute injection having a relatively short injection time. The injection time of the normal injection is relatively long, and therefore, the needle lift position reaches the maximum position. To the contrary, the injection time of the minute injection is relatively short, and therefore, the needle lift position does not reach the maximum position. The normal injection may be referred to as a full lift injection. The minute injection may be referred to as a partial lift injection.

The injection control device 1 includes a control unit 3, an energization control unit 4, an upstream switch 5, a downstream switch 6, a cylinder designation circuit 7, a first cylinder designation switch 8, a second cylinder designation switch 9, a valve closing detection circuit 10, and a valve closing time counter 11. The valve closing detection circuit 10 corresponds to a valve closing detection unit. The valve closing time counter 11 corresponds to a valve closing time measuring unit.

The control unit 3 mainly includes a microcomputer and further includes a CPU, a ROM, a RAM, an I/O, and the like. The control unit 3 performs various processing operations based on a program stored in, for example, the ROM. The control unit 3 has a configuration for performing various processing operations and includes an energization instruction switching unit 3a and a valve closing time learning unit 3b. The function produced by the control unit 3 may be provided by software stored in the ROM, which is a substantial memory device, by a computer that executes the software, by only software, by only hardware, or by a combination thereof.

The energization instruction switching unit 3a inputs a sensor signal from a sensor (not shown) provided outside and specifies an injection command timing by using the input sensor signal. When the energization instruction switching unit 3a specifies the injection command timing, the energization instruction switching unit 3a switches ON/OFF of TQ signals 1 to 4 for instructing the energization time according to the specified injection command timing. The TQ signal corresponds to an energization instruction signal. The TQ signals 1 to 4 correspond to the injectors 2a to 2d, respectively.

The energization control unit 4 acquires the energization current profile from the control unit 3 via a serial communication path and stores the acquired energization current profile in its internal memory. When the energization control unit 4 detects the ON/OFF switching of the TQ signals 1 to 4, the energization control unit 4 drives the upstream switch 5 and the downstream switch 6 according to the energization current profile stored in the internal memory.

The upstream switch 5 is a switch provided on the upstream side of the injectors 2a to 2d. The upstream switch 5 includes a discharge switch for turning ON/OFF of the discharge of the boosted voltage Vboost applied to the injectors 2a to 2d, and a constant current control switch for constant current control using the power supply voltage VB.

The discharge switch and the constant current control switch include, for example, n-channel type MOS transistors. It is noted that, the discharge switch and the constant current control switch may include transistors of another type such as bipolar transistors.

The downstream switch 6 is a switch provided on the downstream side of the injectors 2a to 2d. The downstream switch 6 includes a cylinder selection switch for selecting a cylinder. The cylinder selection switch includes an n-channel type MOS transistor. It is noted that, similarly to the discharge switch and constant current control switch of the upstream switch 5 described above, the cylinder selection switch may include a transistor of another type such as a bipolar transistor.

When the cylinder designation circuit 7 inputs the cylinder designation signal from the control unit 3, the cylinder designation circuit 7 outputs the input cylinder designation signal to the first cylinder designation switch 8 and the second cylinder designation switch 9.

The first cylinder designation switch 8 inputs the TQ signals 1 to 4. When the cylinder designation circuit 7 inputs the cylinder designation signal, the cylinder designation circuit 7 designates the valve closing detection cylinder according to the input cylinder designation signal. The cylinder designation circuit 7 outputs the TQ signal corresponding to the designated valve closing detection cylinder to the valve closing time counter 11. That is, when the first cylinder designation switch 8 inputs the cylinder designation signal, which designates, for example, the injector 2a as the valve closing detection cylinder, from the cylinder designation circuit 7, the first cylinder designation switch 8 designates the injector 2a that corresponds to the valve closing detection cylinder according to the input cylinder designation signal. The first cylinder designation switch 8 outputs the TQ signal 1 corresponding to the designated injector 2a to the valve closing time counter 11.

The second cylinder designation switch 9 inputs a downstream voltage of the injectors 2a to 2d. When the second cylinder designation switch 9 inputs the cylinder designation signal from the cylinder designation circuit 7, the second cylinder designation switch 9 designates the valve closing detection cylinder according to the input cylinder designation signal. The second cylinder designation switch 9 outputs the downstream voltage of the injector corresponding to the designated valve closing detection cylinder to the valve closing detection circuit 10. That is, when the second cylinder designation switch 9 inputs the cylinder designation signal, which designates, for example, the injector 2a for the valve closing detection cylinder, from the cylinder designation circuit 7, the second cylinder designation switch 9 designates the injector 2a for the valve closing detection cylinder according to the input cylinder designation signal. The second cylinder designation switch 9 outputs the downstream voltage of the designated injector 2a to the valve closing detection circuit 10.

The valve closing detection circuit 10 includes an operational amplifier 10a, an AD converter (ADC) 10b, and a waveform inflection point logic 10c. When the operational amplifier 10a inputs the downstream voltage of the injector from the second cylinder designation switch 9, the operational amplifier 10a amplifies the input downstream voltage and outputs the amplified input downstream voltage to the AD converter 10b. When the AD converter 10b inputs the amplified downstream voltage from the operational amplifier 10a, the AD converter 10b performs AD-conversion on the input downstream voltage as amplified that is an analog signal into a digital signal and outputs the AD-converted digital signal to the waveform inflection point logic 10c. The waveform inflection point logic 10c inputs the downstream voltage as AD-converted from the AD converter 10b. When detecting the occurrence of the waveform inflection point in the input downstream voltage, the waveform inflection point logic 10c outputs an inflection point detection notification, which indicates that the occurrence of the waveform inflection point is detected, to the valve closing time counter 11.

The valve closing time counter 11 measures the valve closing time based on the TQ signal input from the first cylinder designation switch 8 and the inflection point detection notification input from the second cylinder designation switch 9 via the waveform inflection point logic 10c. The valve closing time counter 11 outputs the measured valve closing time to the control unit 3. Specifically, when the valve closing time counter 11 detects the switching of the TQ signal input from the first cylinder designation switch 8 from ON to OFF, the valve closing time counter 11 starts time measurement from the point as a starting point. Subsequently, the valve closing time counter 11 waits for the input of the inflection point detection notification from the valve closing detection circuit 10. When the valve closing time counter 11 inputs the inflection point detection notification from the valve closing detection circuit 10, the valve closing time counter 11 ends the measurement of the time. The the valve closing time counter 11 outputs the measured time as the valve closing time to the control unit 3.

When the valve closing time learning unit 3b inputs the valve closing time from the valve closing time counter 11, the valve closing time learning unit 3b combines the input valve closing time and the valve closing time, which has been input in the past, and performs learning of the valve closing time by using a learning algorithm stored in advance.

Figure 2:
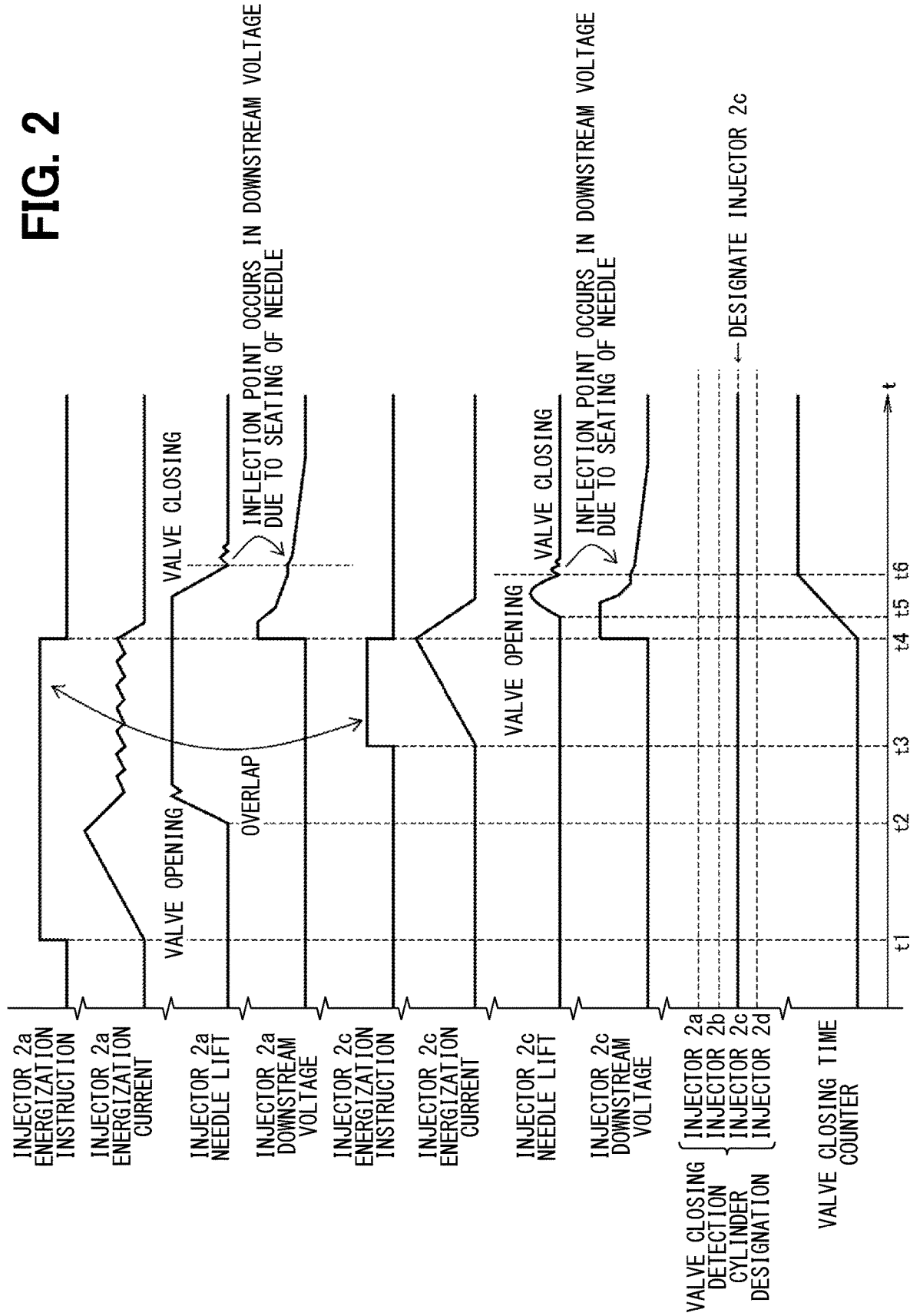
FIG. 2 is a timing chart.

Next, operation of the above configuration will be described with reference to FIGS. 2 to 5. FIG. 2 exemplifies a case where, for example, the injector 2c is designated for the valve closing detection cylinder in a period in which the normal injection of the injector 2a and the minute injection of the injector 2c overlap each other.

In this case, the control unit 3 outputs the cylinder designation signal for designating the injector 2c for the valve closing detection cylinder to the cylinder designation circuit 7. When the cylinder designation circuit 7 inputs the cylinder designation signal from the control unit 3, the cylinder designation circuit 7 outputs the input cylinder designation signal to the first cylinder designation switch 8 and the second cylinder designation switch 9. When the first cylinder designation switch 8 inputs the cylinder designation signal from the cylinder designation circuit 7, the first cylinder designation switch 8 outputs the TQ signal 3 corresponding to the injector 2c to the valve closing time counter 11. When the second cylinder designation switch 9 inputs the cylinder designation signal from the cylinder designation circuit 7, the second cylinder designation switch 9 outputs the downstream voltage of the injector 2c to the valve closing detection circuit 10.

When the control unit 3 specifies the injection command timing of the normal injection for the injector 2a, the control unit 3 switches the TQ signal 1 from OFF to ON (t1). When the energization control unit 4 detects the switching of the TQ signal 1 from OFF to ON, the energization control unit 4 drives the upstream switch 5 and the downstream switch 6 according to the energization current profile. The energization control unit 4 supplies a peak current and a constant current to the injector 2a. When the injector 2a is energized, the injector 2a opens and a needle lift amount of the injector 2a increases (t2). At this time, the injection from the injector 2a is the normal injection. Therefore, the needle lift position reaches the maximum position and is held at the maximum position.

When the control unit 3 specifies the injection command timing of the minute injection of the injector 2c within a period in which the TQ signal 1 is held on, the control unit 3 switches the TQ signal 3 from OFF to ON (t3). When the energization control unit 4 detects the switching of the TQ signal 3 from OFF to ON, the energization control unit 4 drives the upstream switch 5 and the downstream switch 6 according to the energization current profile. The energization control unit 4 supplies a peak current and a constant current to the injector 2c.

When the control unit 3 specifies the injection stop timings of the normal injection for the injector 2a and the minute injection of the injector 2c, the control unit 3 switches the TQ signals 1 and 3 from ON to OFF (t4). When the energization control unit 4 detects the switching of the TQ signals 1 and 3 from ON to OFF, the energization control unit 4 stops energization of the injectors 2a and 2c. When the energization of the injectors 2a and 2c is stopped, a voltage is generated on the downstream side of each of the injectors 2a and 2c. At this time, the injector 2c is designated for the valve closing detection cylinder. Therefore, the valve closing time counter 11 starts measuring of the time when the valve closing time counter 11 detects the switching of the TQ signal 3 from ON to OFF.

Further, the injector 2c is energized, and in response, the injector 2c opens, and the needle lift amount of the injector 2c increases (t5). At this time, the injection of the injector 2c is a minute injection. Therefore, the needle lift position does not reach the maximum position.

Subsequently, due to the stop of the energization of the injectors 2a and 2c, the needle lift amount of the injectors 2a and 2c decreases. When the injectors 2a and 2c are closed, an electromotive force is generated due to a change in magnetic flux when the needle lift is seated, and an inflection point occurs in the downstream voltage of the injectors 2a and 2c. At this time, the injector 2c is designated for the valve closing detection cylinder. Therefore, when the valve closing detection circuit 10 detects the occurrence of the inflection point in the downstream voltage of the injector 2c (t6), the valve closing detection circuit 10 outputs the inflection point detection notification to the valve closing time counter 11.

When the valve closing time counter 11 inputs the inflection point detection notification from the valve closing detection circuit 10, the valve closing time counter 11 ends the measurement of the time. The valve closing time counter 11 outputs the measured time as the valve closing time to the control unit 3. When the control unit 3 inputs the valve closing time from the valve closing time counter 11, the control unit 3 combines the input valve closing time and the valve closing time, which has been input in the past, and performs learning of the valve closing time by using a learning algorithm stored in advance.

In the above-described configuration, the engine has the four-cylinder configuration including the four injectors 2a to 2d. This is provided with the configuration for designating the valve closing detection cylinder out of the four cylinders. In this way, the configuration enables to appropriately learn the valve closing time when the injections overlap with each other, with the only one system of the valve closing detection circuit 10. In particular, the configuration designates the injector that is for minute injection for the valve closing detection cylinder, thereby to enable to appropriately learn the valve closing time of the minute injection.

Next, a pattern for designating the valve closing detection cylinder will be described. Herein, as the pattern for designating the valve closing detection cylinder, a pattern for designating the valve closing detection cylinder following minute injection, a pattern, in which the valve closing detection cylinder is switched and designated every ½ cycle (360° CA) of the injection cycle, and a pattern, in which the valve closing detection cylinder is switched and designated for each one cycle (720° CA) of the injection cycle will be sequentially described.

Figure 3:
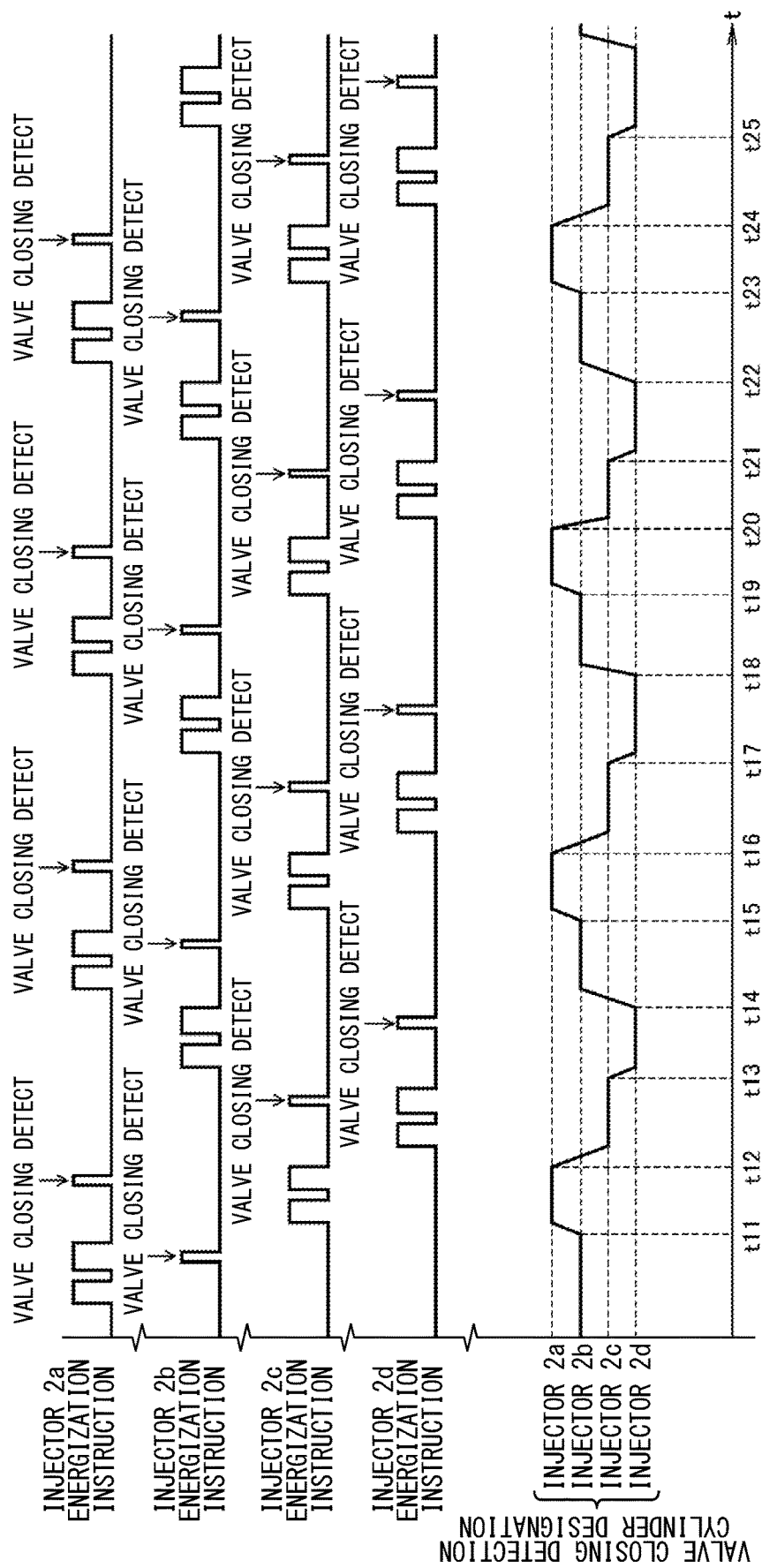
FIG. 3 is a timing chart.

(1) Pattern for Designating the Valve Closing Detection Cylinder Following Minute Injection In the pattern for designating the valve closing detection cylinder following the minute injection, as shown in FIG. 3, the control unit 3 constantly designates a cylinder that performs minute injection as the valve closing detection cylinder according to the injection cycle of the injectors 2a to 2d. In the example of FIG. 3, in the injection cycle, minute injection is repeated by the injector 2b, the injector 2a, the injector 2c, and the injector 2d in this order. Therefore, when the control unit 3 detects the valve closing for the minute injection of the injector 2b, the control unit 3 switches the valve closing detection cylinder from the injector 2b to the injector 2a (t11). When the control unit 3 detects the valve closing for the minute injection of the injector 2a, the control unit 3 switches the valve closing detection cylinder from the injector 2a to the injector 2c (t12). When the control unit 3 detects the valve closing for the minute injection of the injector 2c, the control unit 3 switches the valve closing detection cylinder from the injector 2c to the injector 2d (t13). When the control unit 3 detects the valve closing for the minute injection of the injector 2d, the control unit 3 switches the valve closing detection cylinder from the injector 2d to the injector 2b (t14). Thereafter, the control unit 3 repeats the cycle for switching the valve closing detection cylinders in the order of the injector 2b, the injector 2a, the injector 2c, and the injector 2d (t15 to t25).

That is, the control unit 3 repeats the cycle to sequentially input from the valve closing time counter 11, the valve closing time of minute injection of the injector 2b, the valve closing time of minute injection of the injector 2a, the valve closing time of minute injection of the injector 2c, and the valve closing time of the minute injection of the injector 2d.

In the pattern for designating the valve closing detection cylinder following the minute injection, the valve closing time of the minute injection can be constantly acquired, and the learning speed of the valve closing time of the minute injection can be increased.

Figure 4:
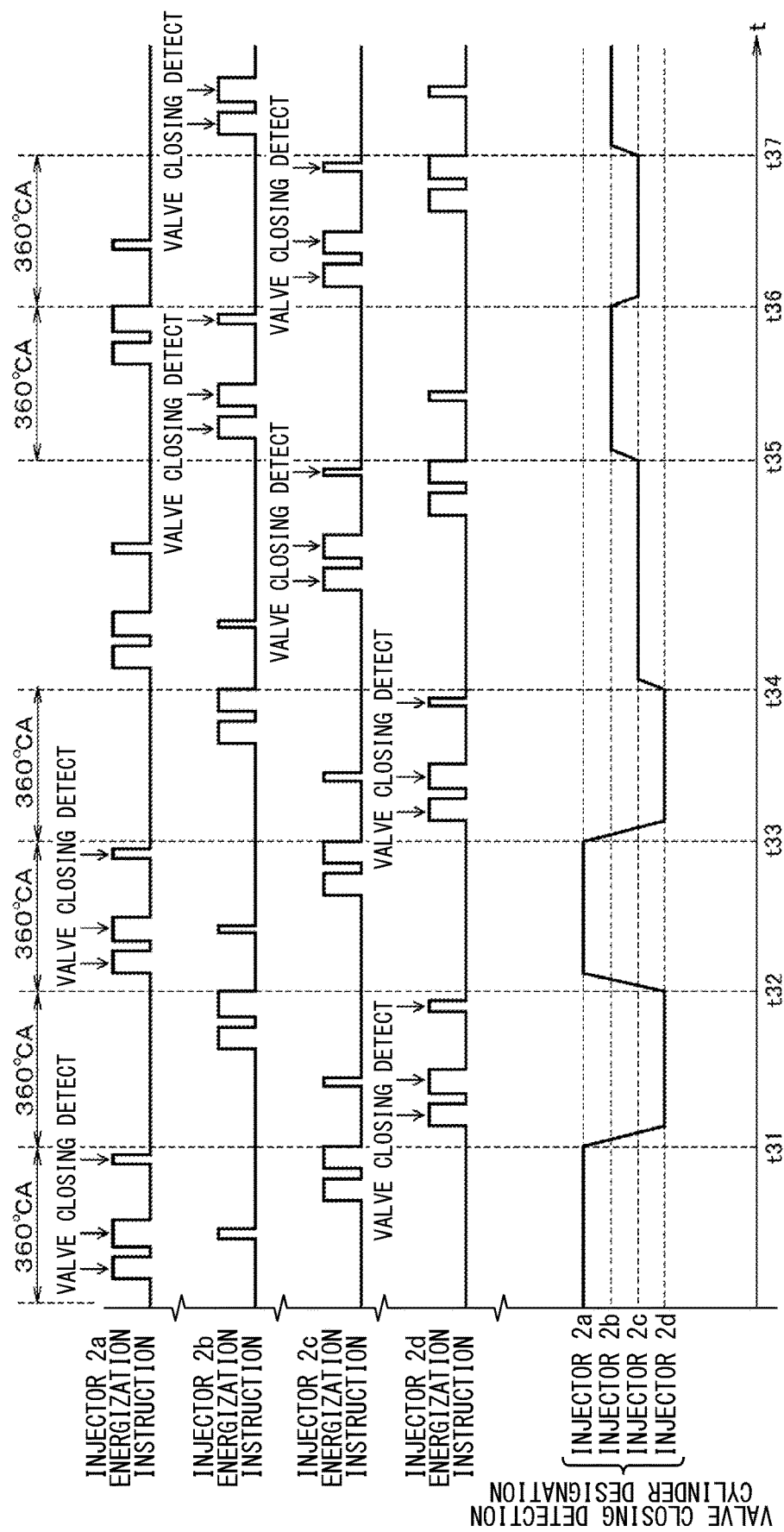
FIG. 4 is a timing chart.

(2) Pattern in Which the Valve Closing Detection Cylinder is Switched and Designated at Every ½ Cycle of the Injection Cycle In the pattern, in which the valve closing detection cylinder is switched and designated at every ½ cycle of the injection cycle, as shown in FIG. 4, the control unit 3 switches and designates the valve closing detection cylinder at every ½ cycle of the injection cycle according to the injection cycle of the injectors 2a to 2d. In the example shown in FIG. 4, the control unit 3 first repeats a cycle in which the valve closing detection cylinder is alternately switched between the injector 2a and the injector 2d at every ½ cycle of the injection cycle (t31 to 34). That is, the control unit 3 repeats the cycle to alternately input from the valve closing time counter 11 the valve closing times of normal injection and minute injection of the injector 2a and the valve closing times of normal injection and minute injection of the injector 2d.

Subsequently, the control unit 3 repeats a cycle in which the valve closing detection cylinder is alternately switched between the injector 2b and the injector 2c at every ½ cycle of the injection cycle (t35 to 37). That is, the control unit 3 repeats the cycle to alternately input from the valve closing time counter 11 the valve closing times of normal injection and minute injection of the injector 2b and the valve closing times of normal injection and minute injection of the injector 2c.

In the pattern in which the valve closing detection cylinder is switched and designated at every ½ cycle of the injection cycle, frequency to acquire the valve closing time can be increased, and detection frequency can be increased, thereby to enable to appropriately detect a failure of the injectors 2a to 2d or the like, compared with (3) the pattern in which the valve closing detection cylinder is switched and designated at every 1 cycle of the injection cycle, which will be described later.

Figure 5:
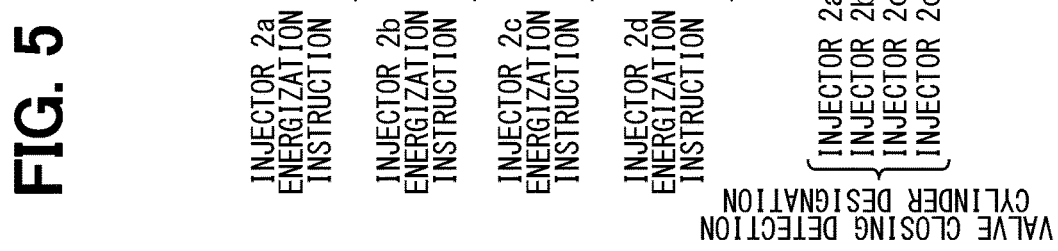
FIG. 5 is a timing chart.
Figure 6:
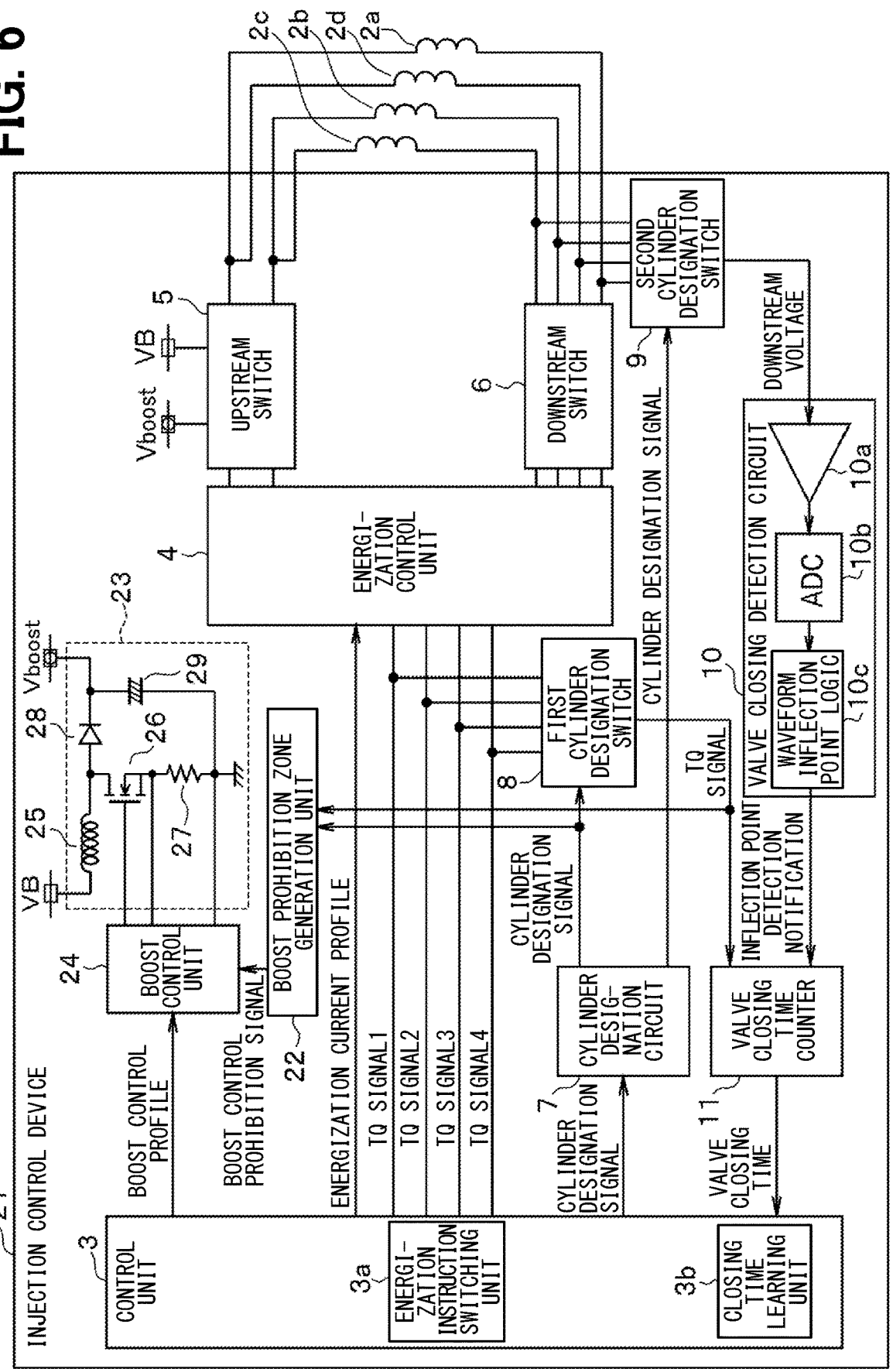
FIG. 6 is a functional block diagram showing a configuration according to a second embodiment.

(3) Pattern in Which the Valve Closing Detection Cylinder is Switched and Designated at Every 1 Cycle of the Injection Cycle In the pattern in which the valve closing detection cylinder is switched and designated at every 1 cycle of the injection cycle, as shown in FIG. 5, the control unit 3 switches and designates the valve closing detection cylinder at every 1 cycle of the injection cycle according to the injection cycle of the injectors 2a to 2d. In the example of FIG. 5, the control unit 3 repeats a cycle in which the valve closing detection cylinder is switched in the order of the injector 2a, the injector 2b, the injector 2c, and the injector 2d at every 1 cycle of the injection cycle (t41 to t44). That is, the control unit 3 repeats the cycle to sequentially input from the valve closing time counter 11 the valve closing times of normal injection and minute injection of the injector 2a, the valve closing times of minute injection and normal injection of injector 2b, the valve closing times of normal injection and minute injection of injector 2c, and the valve closing times of normal injection and minute injection of injector 2d.

In the pattern in which the valve closing detection cylinder is switched and designated at every 1 cycle of the injection cycle, the valve closing detection can be easily synchronized with another control such as an air-fuel ratio control, compared with the (2) pattern in which the valve closing detection cylinder is switched and designated at every ½ cycle of the injection cycle as described above.

It is noted that, the control unit 3 may switch, within one trip, the patterns including the pattern to designate the valve closing detection cylinder following minute injection, the pattern to switch and designate the valve closing detection cylinder at every ½ cycle of the injection cycle, and the pattern to switch and designate the valve closing detection cylinder at every 1 cycle of the injection cycle. Immediately after starting the engine, the control unit 3 may adopt, for example, the pattern for designating the valve closing detection cylinder following minute injection in order to increase the learning speed of the valve closing time of minute injection. After a certain period of time has elapsed subsequent to the immediately after starting the engine, the control unit 3 may adopt, for example, the pattern in which the valve closing detection cylinder is switched and designated at every ½ cycle of the injection cycle in order to increase the detection frequency or may adopt the pattern in which the valve closing detection cylinder is switched and designated at every 1 cycle of the injection cycle in order to facilitate synchronization of valve closing detection with the air-fuel ratio control. Separately from these patterns, a pattern for designating the valve closing detection cylinder following normal injection may be adopted, and a pattern in which the valve closing time of the normal injection is constantly acquired may be used.

The first embodiment as described above produces the following operational effects. The injection control device 1 designates the valve closing detection cylinder among the four cylinders. The injection control device 1 measures the valve closing time, which is from the timing of switching of the TQ signal from ON to OFF to the valve closing detection timing, for the designated valve closing detection cylinder and learns the valve closing time. The configuration designates the valve closing detection cylinder, thereby to enable to avoid increase in the number of the valve closing detection circuit 10 in advance. The configuration enables to appropriately learn the closing time and to appropriately increase the injection amount accuracy, while eliminating the concern of cost increase due to the increase in the number of the valve closing detection circuit 10.

The injection control device 1 designates the cylinder for minute injection as the valve closing detection cylinder, thereby to enable to appropriately learn the closing time of the minute injection.

The injection control device 1 designates the cylinder for normal injection as the valve closing detection cylinder, thereby to enable to appropriately learn the closing time of the normal injection.

When the cylinder designated as the next valve closing detection cylinder is not performing fuel injection, the injection control device 1 designates the valve closing detection cylinder. The configuration enables to avoid a situation in which a cylinder in which fuel injection is being performed is designated as the valve closing detection cylinder, thereby to appropriately designate the cylinder that is to perform fuel injection as the valve closing detection cylinder and to appropriately learn the valve closing time.

The injection control device 1 designates the valve closing detection cylinder at every time, when detecting the valve closing detection of the valve closing detection cylinder, and designates the valve closing detection cylinder following the minute injection. In this way, the configuration enables to constantly acquire the valve closing time for the minute injection, thereby to enable to increase the learning speed of the valve closing time for the minute injection.

The injection control device 1 switches and designates the valve closing detection cylinder at every ½ cycle (360° CA) of the injection cycle, thereby to enable to increase the detection frequency and to appropriately detect failure of the injectors 2a to 2d or the like.

The injection control device 1 switches and designates the valve closing detection cylinder at every cycle (720° CA) of the injection cycle, thereby to enable to easily synchronize the valve closing detection with another control such as the air-fuel ratio control.

Second Embodiment

A second embodiment will be described with reference to FIG. 6 to FIG. 10. The second embodiment differs from the first embodiment described above in performing of a boost switching control. When detecting the valve closing, the configuration prohibits a boost switching control, which could be a noise source, for a certain period of time in order to accurately detect minute voltage fluctuations. Contrary to this, a concern arises that a chargeable time within one cycle may be reduced. In order to address this issue, a high-speed charging circuit that is configured to perform charging in a short time may be provided. It is noted that, in the configuration in which the high-speed charging circuit is provided, another concern arises that the circuit may become large and the manufacturing cost may increase. The second embodiment provides a configuration that secures a chargeable time while eliminating the need for a high-speed charging circuit.

An injection control device 21 includes the control unit 3, the energization control unit 4, the upstream switch 5, the downstream switch 6, the cylinder designation circuit 7, the first cylinder designation switch 8, the second cylinder designation switch 9, the valve closing detection circuit 10, and the valve closing time counter 11, as described in the first embodiment. The injection control device 21 further includes a boost prohibition zone generation unit 22, a boost circuit 23, and a boost control unit 24.

When the cylinder designation circuit 7 inputs the cylinder designation signal from the control unit 3, the cylinder designation circuit 7 outputs the input cylinder designation signal to the first cylinder designation switch 8 and the second cylinder designation switch 9 and further outputs the input cylinder designation signal to the boost prohibition zone generation unit 22. When the first cylinder designation switch 8 inputs the cylinder designation signal from the cylinder designation circuit 7, the first cylinder designation switch 8 designates the valve closing detection cylinder based on the input cylinder designation signal. The first cylinder designation switch 8 outputs the TQ signal corresponding to the designated valve closing detection cylinder to the valve closing time counter 11. The first cylinder designation switch 8 further outputs the TQ signal corresponding to the designated valve closing detection cylinder to the boost prohibition zone generation unit 22.

The boost circuit 23 is a circuit that generates a boost power supply for peak current driving. The boost circuit 23 includes a DC-DC converter including a boost chopper circuit. The boost chopper circuit includes, for example, an inductor 25, a MOS transistor 26 as a switching element, a current detection resistor 27, a diode 28, and a boost capacitor 29, which are connected in the illustrated form. The boost circuit 23 is not limited to the illustrated form, and various forms may be employable.

The boost control unit 24 acquires the boost control profile from the control unit 3 via the serial communication path and stores the acquired boost control profile in the internal memory. The boost control unit 24 performs a boost switching control of the boost circuit 23 according to the boost control profile stored in the internal memory.

When the boost prohibition zone generation unit 22 receives the cylinder designation signal from the cylinder designation circuit 7, the boost prohibition zone generation unit 22 designates the valve closing detection cylinder based on the input cylinder designation signal. The boost prohibition zone generation unit 22 generates the boost prohibition zone based on the TQ signal input from the first cylinder designation switch 8. The boost prohibition zone generation unit 22 outputs the boost control prohibition signal to the boost control unit 24. Specifically, when the boost prohibition zone generation unit 22 detects switching of the TQ signal, which is input from the first cylinder designation switch 8, from ON to OFF, the boost prohibition zone generation unit 22 outputs a boost control prohibition signal to the boost control unit 24 for a certain time from that time point, when detecting the switching of the TQ signal, as a starting point. The boost prohibition zone generation unit 22 prohibits the boost switching control for the valve closing detection cylinder, thereby not to perform the boost switching control. The boost prohibition zone generation unit 22 permits the boost switching control for cylinders other than the valve closing detection cylinder and performs the boost switching control.

Figure 7:
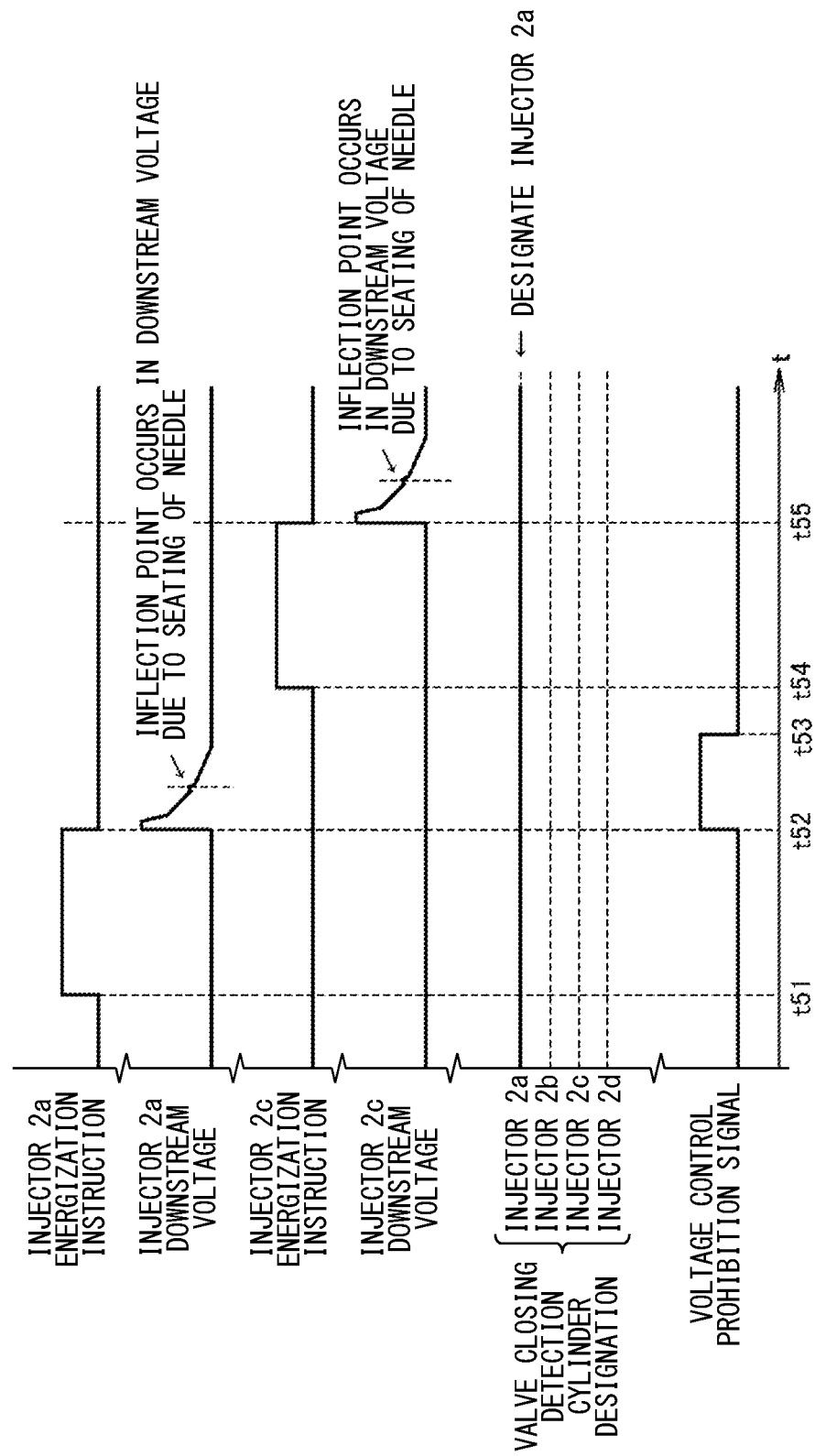
FIG. 7 is a timing chart.

Next, operation of the above configuration will be described with reference to FIGS. 7 to 10. FIG. 7 illustrates an example where the valve closing detection cylinder is designated for the injector 2a.

In this case, the control unit 3 outputs the cylinder designation signal for designating the injector 2a for the valve closing detection cylinder to the cylinder designation circuit 7. When the cylinder designation circuit 7 inputs the cylinder designation signal from the control unit 3, the cylinder designation circuit 7 outputs the input cylinder designation signal to the first cylinder designation switch 8, the second cylinder designation switch 9, and the boost prohibition zone generation unit 22. When the first cylinder designation switch 8 inputs the cylinder designation signal from the cylinder designation circuit 7, the first cylinder designation switch 8 outputs the TQ signal 1 corresponding to the injector 2a to the valve closing time counter 11 and the boost prohibition zone generation unit 22.

When the control unit 3 specifies the injection command timing of the normal injection for the injector 2a, the control unit 3 switches the TQ signal 1 from OFF to ON (t51). When the energization control unit 4 detects the switching of the TQ signal 1 from OFF to ON, the energization control unit 4 drives the upstream switch 5 and the downstream switch 6 according to the energization current profile. The energization control unit 4 supplies a peak current and a constant current to the injector 2a. When the injector 2a is energized, the injector 2a opens and a needle lift position of the injector 2a increases.

When the control unit 3 specifies the injection stop timing of the normal injection of the injector 2a, the control unit 3 switches the TQ signal 1 from ON to OFF (t52). When the energization control unit 4 detects the switching of the TQ signals 1 from ON to OFF, the energization control unit 4 stops energization of the injector 2a. When the energization of the injectors 2a and 2c is stopped, a voltage is generated on the downstream side of each of the injectors 2a and 2c. At this time, the valve closing detection cylinder is designated for the injector 2a, and therefore, the boost prohibition zone generation unit 22 detects switching of the TQ signal 1, which is input from the first cylinder designation switch 8, from ON to OFF. The boost prohibition zone generation unit 22 outputs the boost control prohibition signal to the boost control unit 24 at a certain time from that point as a starting point. The boost prohibition zone generation unit 22 prohibits the boost switching control for the valve closing detection cylinder (t52 to t53).

Subsequently, when the control unit 3 specifies the injection command timing of the normal injection of the injector 2c, the control unit 3 switches the TQ signal 3 from OFF to ON (t54). When the energization control unit 4 detects the switching of the TQ signal 3 from OFF to ON, the energization control unit 4 drives the upstream switch 5 and the downstream switch 6 according to the energization current profile. The energization control unit 4 supplies a peak current and a constant current to the injector 2c. When the injector 2c is energized, the injector 2a opens and a needle lift position of the injector 2c increases.

When the control unit 3 specifies the injection stop timing of the normal injection of the injector 2c, the control unit 3 switches the TQ signal 3 from ON to OFF (t55). When the energization control unit 4 detects the switching of the TQ signals 3 from ON to OFF, the energization control unit 4 stops energization of the injector 2c. When the energization of the injector 2c is stopped, a voltage is generated on the downstream side of each of the injector 2c. At this time, the injector 2a is designated as the valve closing detection cylinder, and therefore, the boost prohibition zone generation unit 22 does not detect switching from ON to OFF of the TQ signal 1 input from the first cylinder designation switch 8. The boost prohibition zone generation unit 22 does not output the boost control prohibition signal to the boost control unit 24. The boost prohibition zone generation unit 22 does not prohibit the boost switching control for the valve closing detection cylinder.

Specifically, modes of generating the charge prohibition zone will be described for the pattern for designating the valve closing detection cylinder following minute injection, the pattern in which the valve closing detection cylinder is switched and designated at every ½ cycle of the injection cycle, and the pattern in which the valve closing detection cylinder is switched and designated at every 1 cycle of the injection cycle, as described in the first embodiment.

Figure 8:
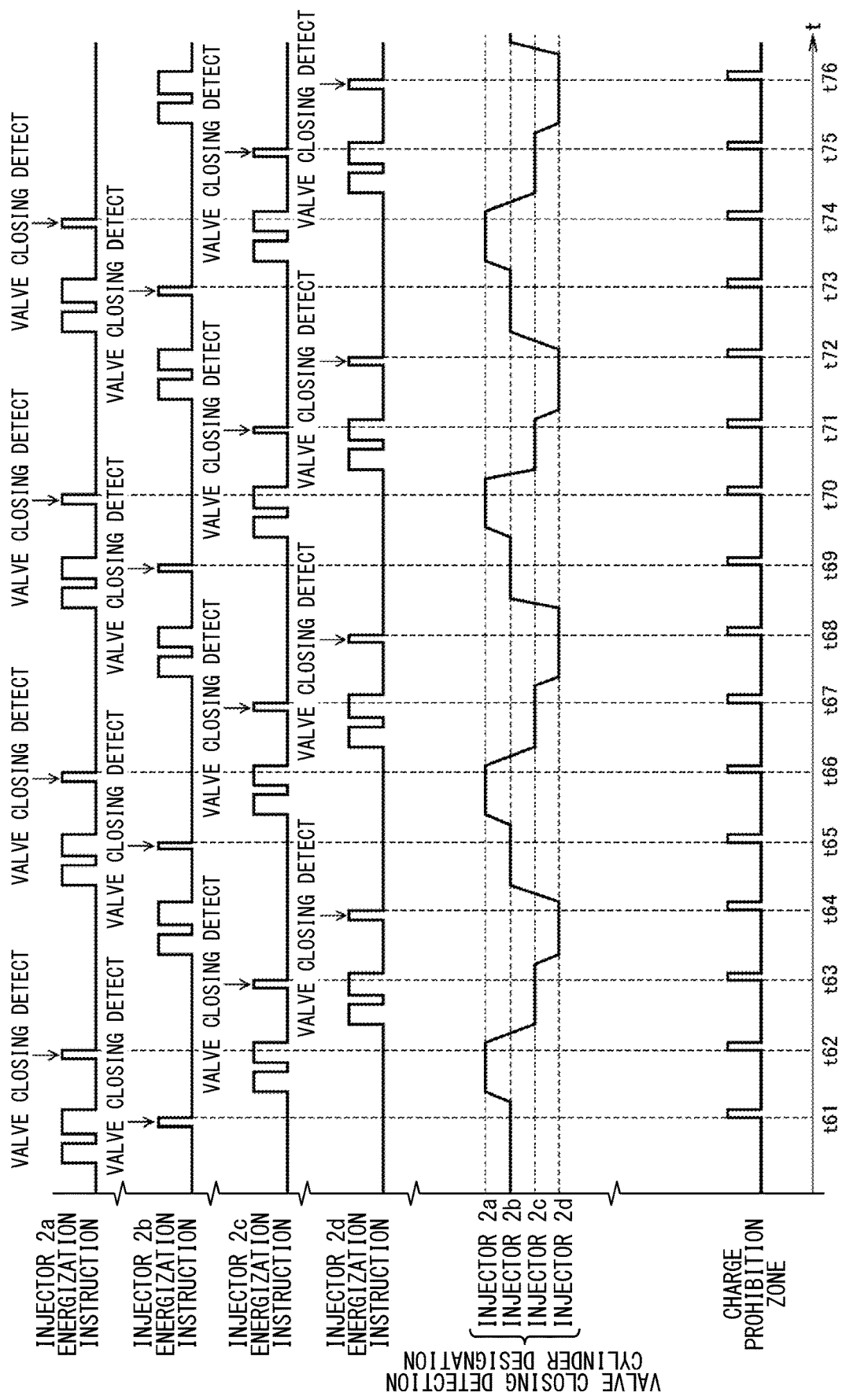
FIG. 8 is a timing chart.
Figure 9:
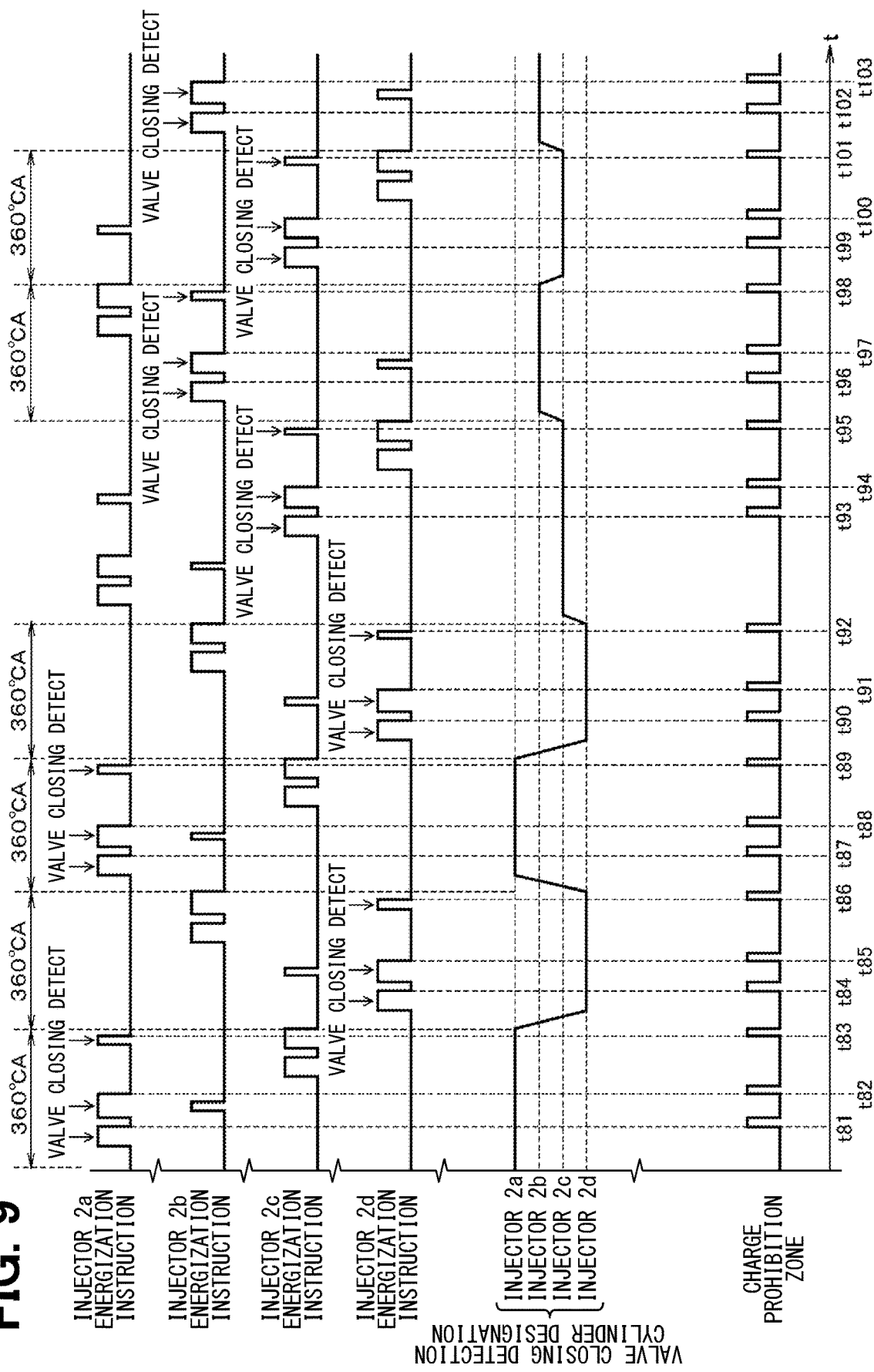
FIG. 9 is a timing chart.
Figure 10:
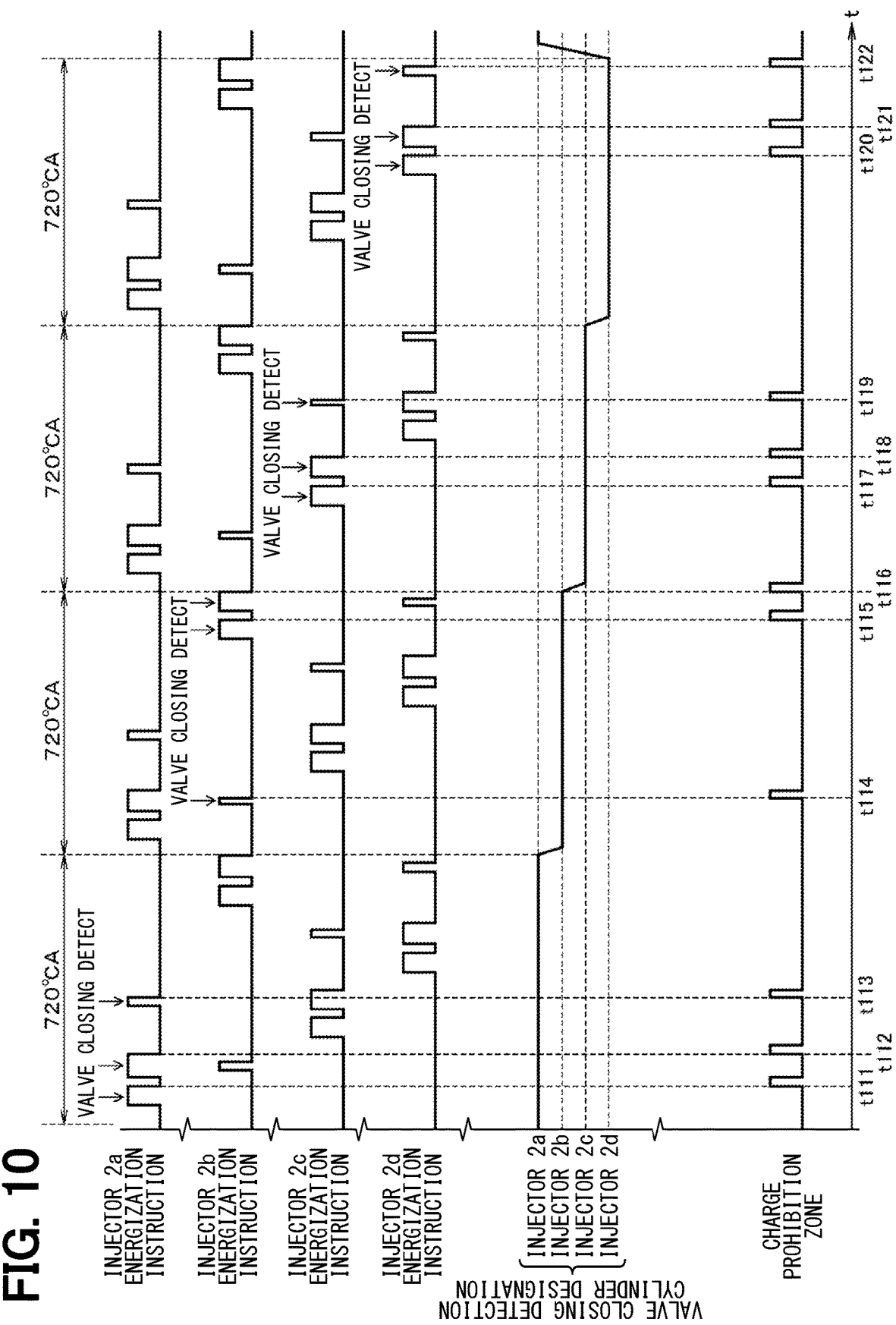
FIG. 10 is a timing chart.

As shown in FIG. 8, in the pattern for designating the valve closing detection cylinder following minute injection, the boost prohibition zone generation unit 22 generates a no-boost zone at every time when the valve closing is detected. the boost prohibition zone generation unit 22 outputs the boost control prohibition signal to the boost control unit 24 in the generated boost prohibition zone (t61 to t76). As shown in FIG. 9, in the pattern in which the valve closing detection cylinder is switched and designated at every ½ cycle of the injection cycle, the boost prohibition zone generation unit 22 generates the no-boost zone at every time when the valve closing is detected. The boost prohibition zone generation unit 22 outputs the boost control prohibition signal to the boost control unit 24 in the generated boost prohibition zone (t81 to t103). As shown in FIG. 10, in the pattern in which the valve closing detection cylinder is switched and designated at every 1 cycle of the injection cycle, the boost prohibition zone generation unit 22 generates the no-boost zone at every time when the valve closing is detected. The boost prohibition zone generation unit 22 outputs the boost control prohibition signal to the boost control unit 24 in the generated boost prohibition zone (t111 to t122).

The second embodiment as described above produces the following operational effects. In the period where close of the valve closing detection cylinder is detected, the injection control device 21 does not perform the boost switching control for the valve closing detection cylinder. The injection control device 21 performs the boost switching control for a cylinder other than the valve closing detection cylinder. The injection control device 21 does not perform the boost switching control for the valve closing detection cylinder, thereby to enable to eliminate noise sources and to detect a minute voltage fluctuation with high accuracy. The injection control device 21 performs the boost switching control for the cylinders other than the valve closing detection cylinder, thereby not to require a high-speed charging circuit and to enable to properly assure the chargeable time.

Other Embodiments

Although the present disclosure has been described in accordance with the examples, it is understood that the present disclosure is not limited to such examples or structures. The present disclosure encompasses various modifications and variations within the scope of equivalents. Additionally, various combinations and configurations, as well as other combinations and configurations including more, less, or only a single element, are within the scope and spirit of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An injection control device configured to control opening and closing of a plurality of fuel injection valves to inject fuel to an internal combustion engine, the injection control device comprising:
   an energization instruction switch configured to switch a plurality of energization instruction signals ON and OFF to instruct energization of the plurality of fuel injection valves;
   a first cylinder designation switch configured to designate one of the plurality of energization instruction signals, which correspond to the plurality of fuel injection valves respectively, to designate a valve closing detection cylinder;
   a valve closing detection unit configured to monitor a plurality of downstream voltages of the fuel injection valve to detect occurrence of an inflection point in change of the plurality of downstream voltages and to detect valve closing;
   a second cylinder designation switch configured to designate one of the plurality of downstream voltages, which correspond to the plurality of fuel injection valves respectively, and to designate the valve closing detection cylinder;
   a valve closing time measuring unit configured to measure a valve closing time, which is from a switching timing at which the energization instruction signal is switched from ON to OFF to a valve closing detection timing at which the valve closing detection unit detects the valve closing, for injection of the valve closing detection cylinder; and
   a valve closing time learning unit configured to learn the valve closing time measured by the valve closing time measuring unit.

2. The injection control device according to claim 1, wherein
   the first cylinder designation switch and the second cylinder designation switch are configured to designate, when injections of a plurality of cylinders overlap, one of the plurality of cylinders, in which the injections overlap, as the valve closing detection cylinder.

3. The injection control device according to claim 2, wherein
   the first cylinder designation switch and the second cylinder designation switch are configured to designate, as the valve closing detection cylinder, a cylinder, in which an injection time is shortest, from the plurality of cylinders in which the injections overlap.

4. The injection control device according to claim 2, wherein
   the first cylinder designation switch and the second cylinder designation switch are configured to designate, as the valve closing detection cylinder, a cylinder, in which an injection time is longest, from the plurality of cylinders in which the injections overlap.

5. The injection control device according to claim 1, wherein
   the first cylinder designation switch and the second cylinder designation switch are configured to designate the valve closing detection cylinder when injection is not performed for the cylinder which is designated as a next valve closing detection cylinder.

6. The injection control device according to claim 1, wherein
   the first cylinder designation switch and the second cylinder designation switch are configured to designate the valve closing detection cylinder at every time when the valve closing detection unit detects valve closing of the valve closing detection cylinder.

7. The injection control device according to claim 1, wherein
the first cylinder designation switch and the second cylinder designation switch are configured to switch and designate the valve closing detection cylinder at every ½ cycle of the injection cycle.

8. The injection control device according to claim 1, wherein
the first cylinder designation switch and the second cylinder designation switch are configured to switch and designate the valve closing detection cylinder at every 1 cycle of the injection cycle.

9. The injection control device according to claim 1, further comprising:
a boost circuit configured to generate a booster power supply for peak current driving; and
a boost control unit configured to perform a boost switching control of the boost circuit, wherein
the injection control unit is configured not to perform the boost switching control for the valve closing detection cylinder and to perform the boost switching control for a cylinder other than the valve closing detection cylinder in a period in which the valve closing detection unit detects the valve closing of the valve closing detection cylinder.

\* \* \* \* \*